United States Patent Office 3,386,965
Patented June 4, 1968

3,386,965
AROMATIC POLYAMIDES HAVING PENDENT CARBOXYL GROUPS AND PROCESS THEREFOR
William A. H. Huffman, deceased, late of Durham, N.C., by Ernestine H. Huffman, executrix, Antioch, Tenn., and Ralph W. Smith, Parkwood, and Helmuth E. Hinderer, Durham, N.C., assignors to Monsanto Company, St. Louis, Mo., a corporation of Delaware
No Drawing. Filed Aug. 31, 1964, Ser. No. 393,816
10 Claims. (Cl. 260—78)

ABSTRACT OF THE DISCLOSURE

Aromatic polyamides having pendent carboxyl groups as an aid to solubility are described together with a process for their preparation. These polyamides are useful as films and fibers.

---

Wholly aromatic polyamides in the form of shaped articles have become useful in a wide range of applications, particularly those requiring temperature resistant properties. They are, however, characteristically insoluble or only slightly soluble in organic solvents, including the usual solvents for well known polyamides, such as polyhexamethylene adipamide, made from intermediates having aliphatic character. Strong acids such as concentrated sulfuric acid and solvents such as dimethylacetamide containing dissolved inorganic salts are good solvents for poly-m-benzamide, poly-m-phenylene isophthalamide and other selective wholly aromatic polyamides based on benzene derivatives. Such solvents, however, require very stringent conditions and extra processing steps to insure removal of substantially all traces of the salts in the finished product. These solvents also fail to dissolve appreciably wholly aromatic polyamides which contain para oriented benzene rings or biphenyl ring structures, naphthalene ring structures and other multiple aromatic ring polyamides.

Accordingly, it is an object of this invention to provide new wholly aromatic polyamides which have pendent carboxyl groups attached thereto in order to improve their solubility.

It is another object of the invention to provide aromatic single, multiple and fused ring polyamides having pendent carboxyl groups.

An additional object of the invention is to provide a process for the preparation of aromatic single, multiple and fused ring polyamides having pendent carboxyl groups.

Another object of the invention is to provide fibers, filaments, films and other shaped articles prepared from aromatic single, multiple and fused ring polyamides containing pendent carboxyl groups.

Other objects and advantages of the invention will become apparent from the description which follows hereafter.

In general, these and other objects of the invention are attained by the provision of aromatic polyamides having the formula $$\text{HN}-\underset{(\text{R})_n}{\overset{(\text{COOH})_n}{\text{X}}}-\text{NH}-\overset{O}{\overset{\|}{\text{C}}}-\underset{(\text{R})_n}{\text{Y}}-\overset{O}{\overset{\|}{\text{C}}}$$

wherein X and Y are divalent aromatic radicals of from 6 to 22 carbon atoms, R is a monovalent radical which is non-polyamide forming, is non-reactive in the polymerization of said polyamide and which has the functionality of at least 1 and $n$ is an integer of from 1 through 4. X and Y are aromatic rings composed of one or a plurality of aromatic benzene type rings possessing resonance either fused or bonded by valence bonds or other types of hydrocarbon linkages, such as phenylene, naphthalene and biphenylene linkages. The carboxyl groups are attached to carbon atoms non-adjacent to the point of attachment of the nitrogen atoms. The R groups which are pendent to the main polymer chain may vary considerably, depending on the type of end product desired. Groups such as lower alkyl, aryl, lower alkoxy, halogen, nitro, carbalkoxy, sulfo, hydroxy phenyl, sulfonyl and other non-polyamide forming groups may be used. The pendent carboxyl groups improve the solubility of the polymers and also impart other desirable characteristics although they are reactive groups. The process of this invention makes it possible for the carboxyl groups, normally polyamide forming, to remain inactive while the amino groups on the same molecule are reacting with carbonyl groups of the diacid chloride molecule. Due to the nature of the polymerization reaction, these groups form complexes with the polymerization solvent which is used and, therefore, are held in solution during the course of the polymerization reaction and do not enter into the reaction itself.

As examples of the polymers of the invention which come within the scope of the above general formula, there may be mentioned polyamides prepared from 2,2'-dicarboxy-4,4'-diamino diphenyl,

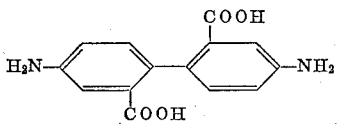

4,4'-diaminobiphenyl-2-carboxylic acid,

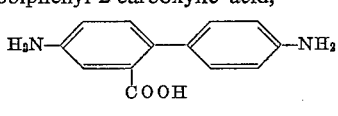

3,3'-diaminobiphenyl-5-carboxylic acid,

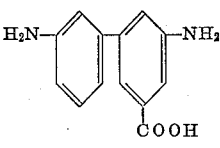

3,5-diaminobenzoic acid,

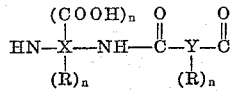

3,3' - diaminobiphenyl-5-carboxylic acid, 3,5'-diamino - 4-methyl benzoic acid, monomethyl 4,4'-diaminodiphenate, 2'-methyl-4,4'-diaminobiphenyl-2-carboxylic acid; 2,6-diamino-8-methyl naphthalene dicarboxylic acid and others which correspond to the general formula

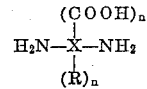

wherein X and Y are divalent aromatic radicals of from 6 to 22 carbon atoms, R is a monovalent radical which is non-polyamide forming, is non-reactive in the polymerization of said polyamide and which has the functionality of at least 1 and $n$ is an integer of from 1 through 4, with comonomers such as isophthaloyl chloride, terephthaloyl chloride, 2,6-naphthalene dicarbonyl chloride, 4,4'-dibenzoyl chloride isopropylidine dibenzoic acid, t-butyl isophthalic acid, tetrachloroterephthalic acid, and the like which can be described as having the general formula

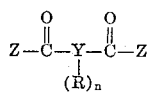

wherein Z is a halogen such as chlorine and bromine, Y is an aromatic radical of from 6 to 22 carbon atoms, R is a hydrogen or a non-polyamide forming radical as defined for the diamine, and $n$ is an integer of from 1 through 4.

It is possible to prepare spinning solutions of many of the polymers of this invention in common organic solvents without the necessity of adding alkali metal salts to the organic solvents such as is the case with most other aromatic polyamides. Solvents such as dimethylacetamide, dimethylformamide, dimethylsulfoxide, and others may be used per se with no alkali metal salts to dissolve polymers prepared from 2,2'-carboxy-4,4'-diaminobiphenyl and any dicarboxylic aromatic acid and polymers prepared from diamines, such as 3,5-diaminobenzoic acid and 4,4'-diaminobiphenyl-2-carboxylic acid with isophthalic acid. These diamines when polymerized with terephthalic acid 4,4'-bibenzoic acid, 2,6-napthalene dicarboxylic acid and other multiple and fused ring dicarboxylic acids produce polymers easily dissolved in dimethylacetamide and dimethylformamide with from 1 to 5 percent by weight of an alkali metal salt. As a general rule polymers from such para oriented and multiple and fused ring diamines and dicarboxylic acids are insoluble in practically all known solvents regardless of whether the solvent contains alkali metal salts.

The polymers of this invention may be polymerized by solution polymerization techniques. In the solution polymerization method, the diamine is dissolved in a suitable organic solvent or solvent mixture which is inert to the polymerization reaction. The same solvents may be used for both the diamine and diacid chloride. Among such solvents there may be mentioned dimethylacetamide and other N,N'-dialkylamides, 1-methyl-2-pyrrolidone, 1,5-dimethyl-2-pyrrolidone and other N-alkyl pyrrolidones, sulfolane, N,N,N',N'-tetramethyl urea, hexamethylphosphoramide and the like. Mixtures of these solvents may also be used. The preferred solvent for solution polymerization is dimethylacetamide. These solvents may be altered to enhance their solubilizing effect by water, tertiary amines, inorganic salts, quaternary ammonium salts and inorganic bases. The diamine solution is cooled to between 5 and —20° C. and the diacid chloride is added either as a solid or in a solution of one of the aforementioned solvents or other inert solvents. The solution is then stirred for a period of time until polymerization is substantially complete and a high viscosity is obtained. The highly viscous solution may be spun after neutralization of HCl of reaction with suitable base or the polymer may be isolated by pouring the mixture into a nonsolvent coagulant, washing and drying the polymer and then preparing the spinning solution.

The amounts of the various reactants which may be employed will, of course, vary according to the type of polymer desired. However, in most instances substantially equimolar quantities may be used. The exact amount is easily determined by one skilled in the art. For optimum results, i.e. high molecular weight, the reaction temperature must be below about 20° C. At such low temperatures the amide formation will proceed faster than competing reactions such as anhydride formation involving the carboxyl groups on aromatic ring, amide interchange between solvent and the diamine.

The diamine reactants can be prepared by any of several well known reactions, such as nitration of acids and their subsequent reduction from the dinitro to the diamine form, rearrangement of substituted benzidines or alkaline fusion of substituted fluorinones.

The positioning of the carboxyl groups on the aromatic ring of the diamine is limited only in that such carboxyl groups cannot be attached to carbon atoms adjacent to the carbon atoms to which the amino groups are attached. For example, in m-phenylenediamine the carboxyl can be attached to the number 3 position carbon, for 4,4'-diaminobiphenyl the carboxyl groups can be positioned 2,2'- and 6,6', and for 2,6-diamino naphthalene they may be positioned 4 and 8.

The invention is further illustrated by the following examples in which all parts and percents are by weight of total reactants unless otherwise indicated and all inherent viscosity measurements were obtained from a 0.5 percent concentration of polymer in conc. sulfuric acid at 30° C.

Example I

Into a 500 ml. Waring Blendor cup was placed 60 ml. of H₂O, 5.22 grams of Na₂CO₃ (0.045 mole), 4.12 grams of 4,4'-diamino-2,2'-dicarboxydiphenyl referred to as DPA hereafter and 0.015 gram of sodium lauryl sulfate. To this rapidly stirred initial emulsion was added 3.05 grams (0.015 mole) of isophthaloyl chloride dissolved in 70 ml. of tetrahydrofuran. The mixture was stirred rapidly for 10 minutes and then allowed to stand while the gel-like polymer settled out. The polymer was then acidified to break up the gel, and in the process is dissolved in the tetrahydrofuran phase of the emulsion. From a portion of this layer the solvent was evaporated leaving fibrils and film. The remaining tetrahydrofuran was evaporated from the mixture and the polymer was isolated by filtration, washed thoroughly and dried. A yield of approximately 5 grams of polymer representing approximately 93% of theoretical was obtained. The polymer had an inherent viscosity of approximately 0.4 as measured in a 0.5 percent solution in concentrated sulfuric acid. Differential thermal analysis and thermogravimetric analysis data indicated superior thermal stability. Only a minor exotherm was shown at 350° C. by the thermogram. Weight retention from 100° C. to 700° C. was 82 percent.

Example II

A 250 ml. conical, three necked flask was equipped with a nitrogen inlet tube, stirrer and drying tube. The flask was charged with 5.44 g. (0.02 mole) of DPA and 48 ml. of DMAc. The DMAc had been dried by azeotropic distillation with benzene. The solution was chilled in an ice water bath and 4.06 g. (0.02 mole) of isophthaloyl chloride was added. The clear dope was stirred at ambient temperature for several hours, then the polymer was coagulated into water in a Waring Blendor. The product was washed thoroughly with water and dried. The inherent viscosity was 0.91.

Example III

A polyamide of benzidine and 4,4'-dibenzoyl chloride was prepared as follows: Into a 1 liter Waring Blendor cup was placed 8.48 grams of sodium carbonate, 0.2 gram of sodium lauryl sulfate, 5.14 grams of benzidine dihydrochloride and 150 ml. of water. To this rapidly stirred emulsion was added 5.58 grams bibenzoyl chloride in 100 ml. of tetrahydrofuran. The mixture was stirred for 10 minutes, filtered, and the resulting polymer was washed thoroughly and dried. The yield was 90 percent. This polymer was insoluble in dimethylacetamide and in dimethylacetamide containing lithium chloride. Only a dilute solution could be prepared in hot concentrated sulfuric acid. The inherent viscosity of this polymer was 0.82. This example indicates the relative insolubility of polymers similar to those of this invention but without pendent carboxyl groups attached to the diamine aromatic nucleus portion.

Example IV

A 0.01 molar solution polymerization of 2.72 DPA and 2.53 g. of 2,6-naphthalenedicarbonyl chloride in 24 ml. of dimethylacetamide was carried out. The polymer became very viscous immediately upon the addition of the acid chloride, and it was necessary to add 26 ml. more of the dimethylacetamide to maintain the polymer in solution. The polymer was isolated by pouring the solution slowly into a Waring Blendor containing methanol and filtering the resulting mixture. The polymer was thoroughly washed and dried. A yield of 4.6 grams was obtained having an inherent viscosity of 3.4. A strong flexible film of this polymer was obtained by heating the film of the solution at 120° C. for 1 hour.

Example V

The polyamide of 2.79 g. 4,4'-bibenzoyl chloride and 2.72 DPA was prepared in 24 ml. dimethylacetamide (on a 0.01 molar scale). The operation technique was similar to that described in Example VI but the polymer appeared to be more soluble than the polymer described under Example VI. This polymer was allowed to stand in solution overnight during which it formed a gel which was coagulated with methanol. The inherent viscosity of this polymer was 2.7.

Example VI

A 0.02 molar solution polymerization of 4.06 g. terephthaloyl chloride and 5.44 g. DPA was carried in 48 ml. dimethylacetamide. The resulting highly viscous solution was poured in a very fine stream into a Waring Blendor containing methanol. A translucent fiber wrapped around the rotating blades of the Blendor and almost stalled the motor. This fiber was removed and one length of it was dried. The tenacity of the undrawn fiber was 2.03 grams per denier at 13 percent elongation and the initial modulus was 68 grams per denier. Thermogravimetric analysis showed a retention of 76 percent of the weight of the polymer on being heated from 100 to 700° C. Visual melting point studies indicated no melting point below 500° C. Strong fibers were cast from a solution of the polymer.

Example VII

A 200 ml. conical flask equipped with an inlet tube for a nitrogen blanket, a stirrer and drying tube was charged with 4.56 grams (0.02 mole) of 4,4'-diaminobiphenyl-2-carboxylic acid and 60 ml. of dimethylacetamide. The mixture was warmed briefly to effect solution of the diamine: then the solution was chilled in an ice water bath, and 4.06 grams (0.02 mole) of isophthaloyl chloride was added in one portion. Approximately five minutes later the cooling bath was removed and stirring was continued at ambient temperature for 2 hours. The amber viscous dope was treated with 0.46 gram of dried lithium hydroxide, stirred for another hour, then diluted with 50 ml. of dimethylacetamide, and poured into water. The precipitated polymer was slurried with water and methanol, then dried under vacuum. The fluffy fibers, slightly off-white material, weighed 6.5 grams (90.2 percent yield) and had an inherent viscosity of 2.33. Thermogravimetric analysis indicated that a slow loss in weight occurred in the range of 300 to 500° C. which appeared to be due mainly to decarboxylation. The weight loss up to 500° C. was only slightly more than that calculated for removal of the carboxyl group. A more rapid weight loss began to ensue above 500° C. A film was dry cast at 95 to 105° C. from a dope of one gram of the polymer and a 9.5 ml. of dimethylacetamide. After soaking in water and drying under vacuum the clear strong flexible film was found to be drawable above 200° C.

Example VIII

The procedure of Example VII was employed for the condensation of 2.28 grams (0.01 mole) of 4,4'-diaminobiphenyl-2-carboxylic acid in 35 ml. of dimethylacetamide containing 5 percent lithium chloride with 2.03 grams (0.01 mole) of terephthaloyl chloride. The reaction was allowed to proceed for 5 hours after which the dope was diluted with 50 ml. of dimethylacetamide containing 5 percent dissolved lithium chloride and poured into water in a Waring Blendor. The product was washed in the blendor with hot water and methanol and then dried under vacuum at about 110° C. to give 3.4 grams (94.5 percent of yield) of a fluffy light olive colored material having an inherent viscosity of 1.19. Thermogravimetric analysis indicated a slow loss in weight occurring in the range of 320 to 500° C. appearing to be due mainly to decarboxylation. A more rapid weight loss ensued above 500° C.

Example IX

Following the procedure of Example VII 3.42 grams (0.015 mole) of 4,4'-diaminobiphenyl-2-carboxylic acid in 75 ml. of dimethylacetamide containing 5 percent dissolved lithium chloride with 3.80 grams (0.015 mole) of 2,6-naphthalene dicarbonyl chloride. This reaction mixture became very viscous and 45 ml. of solvent was added to give a more fluid dope. The polymer was coagulated in water, slurried with methanol, hot water, acetone and again with methanol. The very fluffy granular green product weighed 5.5 grams (90 percent yield) and had an inherent viscosity of 2.83. Thermogravimetric analysis of this polymer was similar to that of Example VIII.

Example X

A solution was prepared containing 4.56 grams (0.02 mole) of 4,4'-diaminobiphenyl-2-carboxylic acid, 95 ml. of dimethylacetamide and 5 grams of lithium chloride. To a chilled solution was added 5.58 grams (0.02 mole) of bibenzoyl chloride and another 5 ml. of solvent. After stirring at room temperature for 1½ hours the viscous dope was diluted with 25 ml. of dimethylacetamide and the reaction continued for another 1½ hours. The polymer was precipitated then slurried with methanol, hot water and again methanol. The dried fluffy very light green colored material weighed 8.2 grams (04.2 percent yield) and had an inherent viscosity of 1.85.

Example XI

Into a 500 ml. conical flask was placed 21.31 grams (0.14 mole) of 3,5-diamino benzoic acid (3,5 DAB) in 360 ml. of dimethylacetamide. To the light amber solution chilled in a Dry Ice isopropyl alcohol bath at −20° was quickly added 28.38 grams (0.14 mole) of isophthaloyl chloride. After approximately 5 minutes the cooling bath was removed and stirring was continued at ambient temperatures for 2 hours, then the dope was treated with 6.7 grams of dried lithium hydroxide. The mixture was stirred for one hour and then poured into 6 liters of water in a Waring Blendor to precipitate the polymer which was then slurried successively with 3 liters of water, 3 liters of hot water, then soaked in 3 liters of methanol to further remove inorganic salt. The vacuum dried slightly off-white material weighed 36.5 grams (92.4 percent yield) and had an inherent viscosity of 1.66. The polymer did not melt when heated to 500° C. A dope containing approximately 16 percent by weight of dissolved polymer in dimethylacetamide was used to dry cast at 100° C. clear flexible strong films which were drawable over a hot pin at 225 to 275° C. with apparent increase in strength. The polymer was dry spun from dimethylacetamide giving filaments which developed strength upon hot drawing.

Example XII

A reaction mixture was prepared containing 5.44 grams (0.036 mole) of 3,5-DAB in 64 ml. of dimethylacetamide and 7.27 grams (0.036 mole) of terephthaloyl chloride. The reaction mixture became viscous and another 16 ml. of solvent was added. The resulting polymer was slurried with methanol and dried under vacuum and was obtained as 9.5 grams of light gray material having an inherent viscosity of 1.36. Thermogravimetric analysis indicated good thermal stability up to 350° C. (98.4 percent weight retention) and somewhat rapid weight loss thereafter. Films were cast at about 100° C. from a dope containing approximately 12 percent polymer in dimethylacetamide containing 5 percent dissolved lithium chloride and soaked in water and then dried under vacuum. These films were transparent, strong, flexible and drawable at 225 to 275° C.

Example XIII

A reaction mixture was prepared containing 3.04 grams (0.02 mole) of 3,5-DAB in 84 ml. of dimethylacetamide in 5.06 grams (0.02 mole) of 2,6-naphthalene dicarbonyl-chloride. The reaction mixture was stirred for 3 hours while stirring with methanol after having washed with water. The resulting product weighed 5.5 grams (76.8 percent yield) and having an inherent viscosity of 0.9. Thermogravimetric analysis indicated good thermal stability up to 350° C. with 98 percent weight retention to that temperature.

As many widely different embodiments of this invention may be made without departing from the spirit and scope thereof, it is to be understood that the invention is not to be limited by the specific embodiments set forth herein but only by the claims which follow.

We claim:

1. A wholly aromatic hydrocarbon polyamide consisting of the recurring structural unit

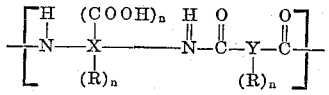

wherein X and Y are aromatic radicals of from 6 to 22 carbon atoms, R is selected from the group consisting of hydrogen, lower alkyl, aryl, lower alkoxy, halogen, nitro, carbalkoxy, sulfo, hydroxy phenyl and sulfonyl, provided that R is attached to carbon atoms of X and Y non-adjacent to those to which the amino groups are attached and n is an integer of from 1 through 4.

2. A wholly aromatic hydrocarbon polyamide consisting of the recurring structural unit

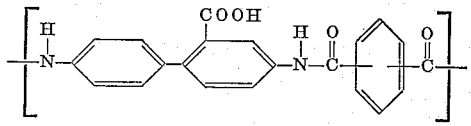

3. A wholly aromatic hydrocarbon polyamide consisting of the recurring structural unit

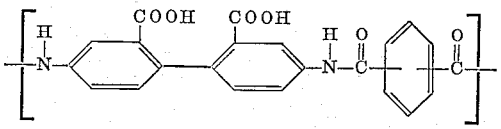

4. A wholly aromatic hydrocarbon polyamide consisting of the recurring structural unit

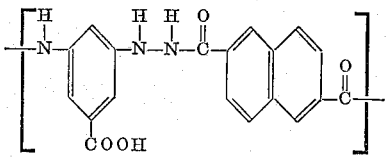

5. A wholly aromatic hydrocarbon polyamide consisting of the recurring structural unit

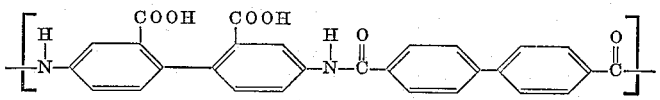

6. A wholly aromatic hydrocarbon polyamide consisting of the recurring structural unit

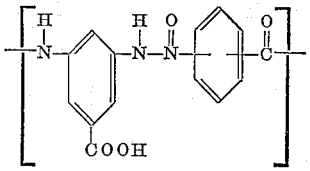

7. The polymer of claim 1 wherein R is hydrogen, X is biphenyl, Y is phenylene and $n$ is 1.
8. The polymer of claim 1 wherein R is hydrogen, X is biphenyl, Y is naphthalene and $n$ is 1.
9. The polymer of claim 1 wherein R is hydrogen, X is biphenyl, Y is biphenyl and $n$ is 1.
10. The polymer of claim 1 wherein R is hydrogen, X is phenylene, Y is naphthalene and $n$ is 1.

References Cited

UNITED STATES PATENTS

| | | | |
|---|---|---|---|
| 2,341,611 | 2/1944 | Hagedorn et al. | 260—78 |
| 3,094,511 | 6/1963 | Hill et al. | 260—78 |
| 3,260,691 | 7/1966 | Lavin et al. | 260—78 |

WILLIAM H. SHORT, *Primary Examiner.*

H. D. ANDERSON, *Assistant Examiner.*

UNITED STATES PATENT OFFICE
CERTIFICATE OF CORRECTION

Patent No. 3,386,965                                     June 4, 1968

William A. H. Huffman, deceased,
by Ernestine H. Huffman, executrix, et al.

It is certified that error appears in the above identified patent and that said Letters Patent are hereby corrected as shown below:

Column 8, lines 13 to 19, the center portion of the formula reading:

      should read      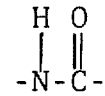

Signed and sealed this 18th day of November 1969.

(SEAL)
Attest:

Edward M. Fletcher, Jr.                   WILLIAM E. SCHUYLER, JR.
Attesting Officer                           Commissioner of Patents